United States Patent
Funaki et al.

(10) Patent No.: US 7,429,631 B2
(45) Date of Patent: Sep. 30, 2008

(54) FLUOROCOPOLYMER

(75) Inventors: Hiroshi Funaki, Ichihara (JP); Hiroki Kamiya, Ichihara (JP)

(73) Assignee: Asahi Glass Company, Limited, Tokyo (JP)

( * ) Notice: Subject to any disclaimer, the term of this patent is extended or adjusted under 35 U.S.C. 154(b) by 324 days.

(21) Appl. No.: 11/200,090

(22) Filed: Aug. 10, 2005

(65) Prior Publication Data

US 2006/0047084 A1 Mar. 2, 2006

(30) Foreign Application Priority Data

Aug. 25, 2004 (JP) ............... 2004-245264

(51) Int. Cl.
*C08F 214/18* (2006.01)

(52) U.S. Cl. ............... 525/326.2; 525/326.3; 526/247; 526/250

(58) Field of Classification Search ............ 525/326.2, 525/326.3; 526/247, 250
See application file for complete search history.

(56) References Cited

U.S. PATENT DOCUMENTS

| | | | | |
|---|---|---|---|---|
| 5,463,006 | A * | 10/1995 | Abusleme et al. | 526/247 |
| 5,942,572 | A * | 8/1999 | Chittofrati et al. | 524/805 |
| 6,660,798 | B1 * | 12/2003 | Marchese et al. | 524/520 |
| 6,750,304 | B2 * | 6/2004 | Kaspar et al. | 526/209 |
| 6,774,196 | B1 | 8/2004 | Taira et al. | |
| 7,015,368 | B2 * | 3/2006 | Wu et al. | 570/177 |

FOREIGN PATENT DOCUMENTS

| | | |
|---|---|---|
| CN | 1294601 A | 5/2001 |
| CN | 1501947 A | 6/2004 |
| EP | 0 595 147 A1 | 5/1994 |
| EP | 0 633 274 A1 | 1/1995 |
| EP | 818489 A2 * | 1/1998 |
| EP | 0 894 839 A2 | 2/1999 |
| EP | 1059342 A1 * | 12/2000 |
| EP | 1630179 A1 * | 3/2006 |
| JP | 53-4115 | 2/1978 |
| JP | 3508136 | 1/2004 |
| JP | 3531974 | 3/2004 |
| WO | WO 99/48939 | 9/1999 |

* cited by examiner

*Primary Examiner*—Peter D. Mulcahy
*Assistant Examiner*—Henry Hu
(74) *Attorney, Agent, or Firm*—Oblon, Spivak, McClelland, Maier & Neustadt, P.C.

(57) ABSTRACT

A fluorecopolymer which comprises repeating units (a) based on tetrafluoroethylene, repeating units (b) based on perfluoro (methyl vinyl ether) and repeating units (c) based on perfluoro(propyl vinyl ether) in a molar ratio of (a)/(b)/(c) of 40-70/3-57/3-57. The fluorocopolymer is a perfluoroelastomer which is excellent in low temperature characteristics, heat resistance and chemical resistance.

20 Claims, No Drawings

FLUOROCOPOLYMER

The present invention relates to a fluorocopolymer.

As a fluororubber, a vinylidene fluoride/hexafluoropropylene copolymer, a tetrafluoroethylene/propylene copolymer, a tetrafluoroethylene/perfluoro(alkyl vinyl ether) copolymer, etc. have been known.

Among them, a tetrafluoroethylene/perfluoro(alkyl vinyl ether) copolymer is called a perfluoroelastomer and is known to be very excellent in heat resistance and chemical resistance.

JP-B-53-4115 discloses a perfluoroelastomer comprising a tetrafluoroethylene (hereinafter referred to as TFE)/perfluoro (methyl vinyl ether) (hereinafter referred to as PMVE)/bromotrifluoroethylene copolymer using PMVE as a perfluoro (alkyl vinyl ether) (hereinafter referred to as PAVE). This copolymer is insufficient in low temperature characteristics.

Further, Japanese Patent No. 3531974 discloses a tetrafluoroethylene/PMVE/perfluoro(polyether vinyl ether) copolymer, but this copolymer is a fluororesin having a high content of repeating units based on TFE and is insufficient in rubber elasticity.

In general, it is known that a TFE/PAVE copolymer having a high content of repeating units based on TFE and having a high fluorine content is excellent in heat resistance, chemical resistance, etc. (for example, Japanese Patent No. 3531974). On the other hand, it is known that such a copolymer having a high content of repeating units based on PAVE has a low glass transition temperature and is excellent in low temperature characteristics (for example, Japanese Patent No. 3508136). However, a perfluoroelastomer which is excellent in low temperature characteristics and is further excellent in heat resistance, chemical resistance, etc. has not been developed yet.

Under these circumstances, it is an object of the present invention to provide a perfluoroelastomer which is excellent in low temperature characteristics and is excellent in heat resistance and chemical resistance.

The present invention provides a fluorocopolymer which comprises repeating units (a) based on TFE, repeating units (b) based on PMVE and repeating units (c) based on perfluoro (propyl vinyl ether) in a molar ratio of (a)/(b)/(c) of 40 to 70/3 to 57/3 to 57.

The present invention further provides a method for producing the above fluorocopolymer, which comprises radical copolymerization of TFE, PMVE and perfluoro(propyl vinyl ether) in the presence of a radical polymerization initiator.

The present invention further provides a crosslinked rubber formed by crosslinking the above fluorocopolymer by an organic peroxide.

The fluorocopolymer of the present invention is a perfluoroelastomer which is excellent in heat resistance and chemical resistance and excellent also in low temperature characteristics. Further, it is also excellent in crosslinking properties, and a crosslinked rubber formed from the fluorocopolymer is excellent in crosslinked rubber physical properties.

Now, the present invention will be described in detail with reference to the preferred embodiments.

The fluorocopolymer of the present invention comprises repeating units (a) based on TFE, repeating units (b) based on PMVE and repeating units (c) based on perfluoro(propyl vinyl ether) (hereinafter referred to as PPVE), in a molar ratio of (a)/(b)/(c) of 40 to 70/3 to 57/3 to 57.

In the fluorocopolymer of the present invention, the molar ratio of (a)/(b)/(c) is preferably 45 to 55/5 to 57/5 to 57. Within this range, the fluorocopolymer will be excellent in heat resistance and chemical resistance and excellent also in low temperature characteristics.

Further, the fluorocopolymer of the present invention preferably further comprises, in addition to the above repeating units (a), (b) and (c), repeating units (d) based on a monomer represented by the formula $CF_2=CFOR^fX$ (wherein $R^f$ is a $C_{1-10}$ perfluoroalkylene group or a $C_{1-10}$ perfluoroalkylene group containing an etheric oxygen atom, and X is Cl, Br, I or CN) in a ratio of (d)/((a)+(b)+(c)) of from 0.01 to 10 (mole %). As the content of the repeating units (d), (d)/((a)+(b)+(c)) is more preferably from 0.01 to 5 (mol %), most preferably from 0.05 to 3 (mol %). Within this range, the fluorocopolymer will be excellent in crosslinking properties, and a crosslinked rubber formed from the fluorocopolymer will be excellent in physical properties such as strength, chemical resistance, heat resistance and compression set.

Specifically, the monomer represented by $CF_2=CFOR^fX$ is preferably at least one member selected from the group consisting of $CF_2=CFOCF_2CF_2Br$ (hereinafter referred to as BrVE), $CF_2=CFOCF_2CF_2Cl$ (hereinafter referred to as ClVE), $CF_2=CFOCF_2CF_2I$ (hereinafter referred to as IVE) and $CF_2=CFOCF_2CF_2CN$ (hereinafter referred to as CNVE). BrVE, IVE and CNVE are more preferred, and BrVE is most preferred.

The fluorocopolymer of the present invention has a Mooney viscosity of preferably from 20 to 150, more preferably from 30 to 150. The Mooney viscosity is a measure of various average molecular weights, and a high Mooney viscosity represents a high molecular weight, and a low Mooney viscosity represents a low molecular weight. Within this Mooney viscosity range, favorable rubber physical properties and processability will be obtained after crosslinking. The Mooney viscosity is a value measured in accordance with JIS K6300 using a large rotor with a diameter of 38.1 mm and a thickness of 5.54 mm at 100° C. for a preheat time of 1 minute for a rotor rotation time of 4 minutes.

The fluorocopolymer of the present invention has a glass transition temperature of preferably at most −1° C., more preferably at most −4° C., most preferably at most −5.5° C. The lower the glass transition temperature, the more excellent the low temperature characteristics.

As a method for producing the fluorocopolymer of the present invention, emulsion polymerization, solution polymerization, suspension polymerization or bulk polymerization may, for example, be mentioned. Further, to initiate the reaction, a radical polymerization initiator, a redox polymerization initiator, heat or radiation may, for example, be employed. Particularly, emulsion polymerization is preferred which is excellent in adjustment of the molecular weight and the composition of the copolymer and in productivity.

In the method for producing the fluorocopolymer of the present invention, TFE, PMVE and PPVE are subjected to radical copolymerization in the presence of a radical polymerization initiator. Otherwise, TFE, PMVE, PPVE and a monomer represented by $CF_2=CFOR^fX$ are subjected to radical copolymerization in the presence of a radical polymerization initiator. The radical copolymerization is carried out preferably in the presence of a chain transfer agent. Particularly when TFE, PMVE and PPVE are subjected to radical copolymerization, the radical copolymerization is carried out preferably in the presence of a chain transfer agent.

Further, it is more preferred to carry out emulsion polymerization of TFE, PMVE and PPVE, or TFE, PMVE, PPVE and a monomer represented by $CF_2=CFOR^fX$, in the presence of an aqueous medium, an emulsifier and a radical polymerization initiator.

The chain transfer agent may, for example, be an alcohol such as methanol or ethanol, a chlorofluorohydrocarbon such as 1,3-dichloro-1,1,2,2,3-pentafluoropropane or 1,1-dichloro-1-fluoroethane, a hydrocarbon such as pentane, hexane or cyclohexane, $RI_2$ (wherein R is a $C_{1-16}$ saturated polyfluoroalkylene group), RIBr (wherein R is a $C_{1-16}$ saturated polyfluoroalkylene group), or a mercaptan such as tert-dodecylmercaptan or n-octadecylmercaptan.

The chain transfer agent is more preferably $RI_2$. Specifically, $RI_2$ may, for example, be 1,4-diiodoperfluorobutane, 1,6-diiodoperfluorohexane or 1,8-diiodoperfluorooctane. Particularly preferred is 1,4-diiodoperfluorobutane. The content of the chain transfer agent is suitably selected in accordance with the chain transfer constant of the chain transfer agent to be used, and in the case of $RI_2$, it is preferably from 0.01 to 5 mol %, more preferably from 0.05 to 1 mol %, based on the total number of mols of the monomers.

As the aqueous medium, water is used, and an aqueous organic solvent may also be preferably used. The aqueous organic solvent may, for example, be tert-butanol, propylene glycol, dipropylene glycol, dipropylene glycol monomethyl ether or tripropylene glycol. Particularly preferred is tert-butanol or dipropylene glycol monomethyl ether. In a case where the aqueous organic solvent is used, its content is preferably from 1 to 40 parts by mass, more preferably from 3 to 30 parts by mass, per 100 parts by mass of water.

The emulsifier is preferably an ionic emulsifier which is excellent in mechanical and chemical stability of latex, more preferably an anionic emulsifier. The anionic emulsifier is preferably a hydrocarbon emulsifier such as sodium lauryl sulfate or sodium dodecylbenzenesulfonate, or a fluorinated fatty acid salt such as ammonium perfluorooctanoate, sodium perfluorooctanoate or ammonium perfluorohexanoate. Further, it is also preferably a fluorinated emulsifier containing an etheric oxygen atom represented by the formula $F(CF_2)_nO(CF(X)CF_2O)_mCF(Y)COOA$ (wherein Y is a fluorine atom or a $C_{1-3}$ perfluoroalkyl group, A is a hydrogen atom, an alkali metal or $NH_4$, n is an integer of from 2 to 10, and m is 0 or an integer of from 1 to 3).

The fluorinated emulsifier represented by $F(CF_2)_nO(CF(X)CF_2O)_mCF(Y)COOA$ may, for example, be $F(CF_2)_3O(CF(CF_3)CF_2O)_2CF(CF_3)COONH_4$, $F(CF_2)_3OCF_2CF_2OCF_2COONH_4$, $F(CF_2)_3O(CF_2CF_2O)_2CF_2COONH_4$, $F(CF_2)_4OCF_2CF_2OCF_2COONH_4$, $F(CF_2)_4O(CF_2CF_2O)_2CF_2COONH_4$, $F(CF_2)_3OCF_2CF_2OCF_2COONa$, $F(CF_2)_3O(CF_2CF_2O)_2CF_2COONa$, $F(CF_2)_4OCF_2CF_2OCF_2COONa$, $F(CF_2)_4O(CF_2CF_2O)_2CF_2COONa$, $F(CF_2)_2OCF_2CF_2OCF_2COONH_4$, $F(CF_2)_2O(CF_2CF_2O)_2CF_2COONH_4$, $F(CF_2)_2OCF_2CF_2OCF_2COONa$, or $F(CF_2)_2O(CF_2CF_2O)_2COONa$.

The emulsifier is more preferably ammonium perfluorooctanoate, $F(CF_2)_4OCF_2CF_2OCF_2COONH_4$, $F(CF_2)_3OCF_2CF_2OCF_2COONH_4$, or $F(CF_2)_2OCF_2CF_2OCF_2COONH_4$.

The content of the emulsifier is preferably from 0.01 to 15 parts by mass, more preferably from 0.1 to 10 parts by mass, per 100 parts by mass of the aqueous medium.

The radical polymerization initiator to be used for emulsion polymerization is preferably a water soluble initiator, and specifically, it may, for example, be a persulfate such as ammonium persulfate, hydrogen peroxide, disuccinic peroxide or an organic initiator such as azobisisobutylamidine dihydrochloride. Further, a redox initiator comprising a combination of a persulfate or hydrogen peroxide and a reducing agent such as sodium hydrogensulfite or sodium thiosulfate, or an inorganic initiator of a system wherein a small amount of iron, a ferrous salt, silver sulfate or the like coexists with the redox initiator, may also be used. The content of the polymerization initiator is preferably from 0.0001 to 3 mass %, more preferably from 0.001 to 1 mass %, based on the monomers to be copolymerized.

Polymerization conditions such as the polymerization pressure and the temperature are suitably selected depending upon the compositions of the monomers, the decomposition temperature of the radical polymerization initiator, etc. Usually, the polymerization pressure is preferably from 0.1 to 20 MPaG, more preferably from 0.3 to 10 MPaG, most preferably from 0.3 to 5 MPaG. The polymerization temperature is preferably from 0 to 100° C., more preferably from 10 to 90° C., most preferably from 20 to 80° C.

The latex of the fluorocopolymer obtained by the above emulsion polymerization is subjected to coagulation by a known method to isolate the fluorocopolymer. For coagulation, addition of a metal salt, addition of an inorganic acid such as hydrochloric acid, mechanical shearing or freezing and thawing may, for example, be employed.

The fluorocopolymer of the present invention is usually blended with a crosslinking agent to obtain a blend, which is molded and heat-crosslinked to prepare a crosslinked rubber, which is used for various applications. As the crosslinking agent, a peroxide, a bisphenol, an amine, triazine or the like is used, and a peroxide is particularly preferred which provides a crosslinked rubber excellent in productivity, heat resistance and chemical resistance.

As the peroxide, an organic peroxide is used. Specifically, it may, for example, be a dialkyl peroxide such as di-tert-butyl peroxide, tert-butyl cumyl peroxide, dicumyl peroxide, α,α-bis(tert-butylperoxy)-p-diisopropylbenzene, 2,5-dimethyl-2,5-di(tert-butylperoxy)hexane or 2,5-dimethyl-2,5-di(tert-butylperoxy)hexane-3, 1,1-di(tert-butylperoxy)-3,3,5-trimethylcyclohexane, 2,5-dimethylhexane-2,5-dihydroxyperoxide, benzoyl peroxide, tert-butylperoxybenzene, 1,3-bis(tert-butylperoxyisopropyl)benzene, 2,5-dimethyl-2,5-di(benzoylperoxy)hexane, tert-butylperoxymaleic acid or tert-butylperoxyisopropylcarbonate. A dialkyl peroxide is preferred.

The content of the organic peroxide is preferably from 0.3 to 10 parts by mass, more preferably from 0.3 to 5 parts by mass, most preferably from 0.5 to 3 parts by mass, per 100 parts by mass of the fluorocopolymer. Within this range, physical properties of a crosslinked product excellent in balance between strength and elongation will be obtained.

When the fluorocopolymer of the present invention is crosslinked, the fluorocopolymer preferably contains a crosslinking aid. When it contains a crosslinking aid, a high crosslinking efficiency will be obtained. Specifically, the crosslinking aid may, for example, be triallyl cyanurate, triallyl isocyanurate, trimethallyl isocyanurate, 1,3,5-triacryloylhexahydro-1,3,5-triazine, triallyl trimellitate, m-phenylenediaminebismaleimide, p-quinonedioxime, p,p'-dibenzoyl quinonedioxime, dipropargyl terephthalate, diallyl phthalate, N,N',N'',N'''-tetrallyl terephthalamide, or a vinyl group-containing siloxane oligomer (such as polymethyl vinyl siloxane or polymethylphenyl vinyl siloxane). Particularly, triallyl cyanurate, triallyl isocyanurate or trimethallyl isocyanurate is preferred, and triallyl isocyanurate is more preferred. The content of the crosslinking aid is preferably from 0.1 to 10 parts by mass, more preferably from 0.5 to 5 parts by mass, per 100 parts by mass of the fluorocopolymer. Within this range, physical properties of a crosslinked product in good balance between strength and elongation will be obtained.

Further, when the fluorocopolymer of the present invention is crosslinked, it is preferred to incorporate a metal oxide as the case requires. When a metal oxide is incorporated, the crosslinking reaction will quickly and securely proceed. Specifically, the metal oxide is preferably an oxide of a bivalent metal such as magnesium oxide, calcium oxide, zinc oxide or lead oxide. The content of the metal oxide is preferably from 0.1 to 10 parts by mass, more preferably from 0.5 to 5 parts by mass, per 100 parts by mass of the fluorocopolymer. Within this range, physical properties of a crosslinked product excellent in balance between strength and elongation will be obtained.

Further, when the fluorocopolymer of the present invention is crosslinked, a pigment for coloring, a bulking agent, a reinforcing agent or the like may be used. As a bulking agent or reinforcing agent which is commonly used, carbon black, titanium oxide, silicon dioxide, clay, talc, polytetrafluoroethylene, polyvinylidene fluoride, polyvinyl fluoride, polychlorotrifluoroethylene, a tetrafluoroethylene/ethylene copolymer, a tetrafluoroethylene/propylene copolymer, a tetrafluoroethylene/vinylidene fluoride copolymer may, for example, be mentioned.

Now, the present invention will be explained in further detail with reference to Examples. However, the present invention is by no means restricted to such specific Examples.

The glass transition temperature and physical properties were measured in accordance with the following methods.

Glass Transition Temperature(° C.)

Using DSC model 220 manufactured by Seiko Instruments Inc., a sample of 10±0.1 mg was heated from −50° C. to 150° C. at 10° C./min and then cooled to −50° C. at 10° C./min, and the center temperature of the obtained endothermic peak change was employed as the glass transition temperature.

Measurement of Physical Properties

100 Parts by mass of a fluorocopolymer, 25 parts by mass of carbon black, 3 parts by mass of triallyl isocyanurate, 1 part by mass of 1,3-bis(tert-butylperoxyisopropyl)benzene (Percadox 14 manufactured by NOF Corporation) and 3 parts by mass of magnesium oxide were kneaded by a twin roll to obtain a fluorocopolymer composition. The fluorocopolymer composition was subjected to hot pressing at 170° C. for 20 minutes and then subjected to secondly crosslinking in an oven of 200° C. for 4 hours to obtain a crosslinked rubber sheet of the fluorocopolymer composition with a thickness of 2 mm. A sample was punched out from the obtained crosslinked rubber sheet by means of a No. 3 dumbbell, and tensile strength and elongation at break were measured in accordance with JIS K6251. Further, hardness was measured in accordance with JIS K6253.

Heat Resistance

The above obtained crosslinked rubber sheet was stored in an oven of 200° C. in an air atmospheric for 672 hours, and then tensile strength and elongation at break were measured in accordance with JIS K6251 in the same manner as the above measurement of the physical properties. Further, hardness was measured in accordance with JIS K6253. The results were evaluated based on the changes as compared with the values before the heat resistance test of A: less than ±5%, B: ±5% or more and less than 25%, and C: 25% or more. The smaller the change, the more excellent the heat resistance.

Measurement of Mooney Viscosity

A viscosity is shown as measured in accordance with JIS K6300 using a large rotor with a diameter of 38.1 mm and a thickness of 5.54 mm at 100° C. for a preheat time of 1 minute for a rotor rotation time of 4 minutes.

EXAMPLE 1

A stainless autoclave having an internal volume of 2,100 cc equipped with an anchor agitator was deaerated, and then 1,500 g of ion-exchanged water, 17 g of ammonium perfluorooctanoate and 304 g of PPVE were charged thereinto, and the gas phase was replaced with nitrogen. The internal temperature was increased to 60° C. with stirring by means of the anchor agitator at a rate of 300 rpm. When the internal temperature reached 60° C., a preliminarily prepared mixed gas of TFE/PMVE=20/80(molar ratio) was injected until the internal pressure in the autoclave became 1.0 MPaG. 5 mL of a 2.5 mass % aqueous ammonium persulfate solution was added to initiate the polymerization.

Since the internal pressure in the autoclave decreased along with the progress of the polymerization, a post-addition mixed gas of TFE/PMVE=70/30 (molar ratio) was injected when the pressure dropped to 0.99 MPa to increase the internal pressure in the autoclave to 1.01 MPaG. The polymerization reaction was continued while this operation was repeatedly carried out to maintain the internal pressure in the autoclave to a range of from 0.99 to 1.01 MPaG. During the polymerization reaction, 0.5 g of BrVE and 25.2 g of PPVE were injected into the autoclave every addition of 13 g of the post-addition mixed gas. Addition of BrVE and PPVE was continued until 377 g of the post-addition mixed gas was added. Upon addition of the post-addition mixed gas of 400 g in total, addition of the post-addition mixed gas was stopped, the internal temperature in the autoclave was decreased to 10° C. to terminate the polymerization reaction, whereby a latex of a fluorocopolymer 1 was obtained. The polymerization time was about 5.5 hours.

The latex was added to a 5 mass % aqueous aluminum potassium sulfate solution so that the latex underwent coagulation to obtain a fluorocopolymer 1. The obtained fluorocopolymer 1 was subjected to filtration, washed with ultrapure water and dried in an oven of 120° C. to obtain 385 g of a white and transparent fluorocopolymer 1. The composition of the fluorocopolymer 1 was such that repeating units based on TFE/repeating units based on PMVE/repeating units based on PPVE/repeating units based on BrVE=54.1/22.3/22.1/1.5 (molar ratio). The fluorocopolymer 1 had a glass transition temperature of −5.8° C., a fluorine content of 73.0 mass % and a Mooney viscosity of 70. Physical properties of a crosslinked rubber sheet obtained from the fluorocopolymer 1 are shown in Table 1. The heat resistance was evaluated, and the result is shown in Table 1.

EXAMPLE 2

A fluorocopolymer 2 was obtained in the same manner as in Example 1 except that $C_4F_9OCF_2CF_2OCF_2COONH_4$ was used instead of ammonium perfluorooctanoate as a fluorinated emulsifier. The composition of the fluorocopolymer 2 was such that repeating units based on TFE/repeating units based on PMVE/repeating units based on PPVE/repeating units based on BrVE=53.4/23.8/21.4/1.4 (molar ratio). The fluorocopolymer 2 had a glass transition temperature of −6.0° C., a fluorine content of 72.3 mass % and a Mooney viscosity of 71. Physical properties of a crosslinked rubber sheet obtained from the fluorocopolymer 2 are shown in Table 1. The heat resistance was evaluated, and the result is shown in Table 1.

EXAMPLE 3

The same autoclave as one used in Example 1 was deaerated, and then 1,300 g of ion-exchanged water, 17 g of ammonium perfluorooctanoate, 30 g of PPVE and 4.1 g of 1,4-diiodooctafluorobutane were charged thereinto. The internal temperature was increased to 60° C. with stirring by means of the anchor agitator at a rate of 300 rpm. When the internal temperature reached 60° C., a preliminarily prepared mixed gas of TFE/PMVE=10/90(molar ratio) was injected until the internal pressure in the autoclave became 1.0 MPaG. 5 mL of a 0.5 mass % aqueous ammonium persulfate solution was added to initiate the polymerization reaction.

Since the internal pressure in the autoclave decreased along with the progress of the polymerization, a post-addition mixed gas of TFE/PMVE=50/50 (molar ratio) was injected when the pressure dropped to 0.99 MPa to increase the internal pressure in the autoclave to 1.01 MPaG. The polymerization reaction was continued while this operation was repeatedly carried out to maintain the internal pressure in the autoclave to a range of from 0.99 to 1.01 MPaG. 5 mL of a 0.5 mass % aqueous ammonium persulfate solution was added every 4 hours. Upon addition of the post-addition mixed gas of 400 g in total, addition of the post-addition mixed gas was stopped, the internal temperature in the autoclave was decreased to 10° C. to terminate the polymerization reaction, whereby a latex of a fluorocopolymer 3 was obtained. The polymerization time was about 21 hours.

The latex was added to a 5 mass % aqueous aluminum potassium sulfate solution so that the latex underwent coagulation to obtain a fluorocopolymer 3. The obtained fluorocopolymer 3 was subjected to filtration, washed with ultrapure water and vacuum dried at 50° C. to obtain 380 g of a white and transparent fluorocopolymer 3. The fluorocopolymer 3 had such a composition that repeating units based on TFE/repeating units based on PMVE/repeating units based on PPVE=51.2/43.7/5.1 (molar ratio), and had a fluorine content of 72.0 mass % and an iodine content of 0.8 mass %. The fluorocopolymer 3 had a glass transition temperature of −9.8° C. and a Mooney viscosity of 45. Physical properties of a crosslinked rubber sheet obtained from the fluorocopolymer 3 are shown in Table 1. The heat resistance was evaluated, and the result is shown in Table 1.

COMPARATIVE EXAMPLE 1

The same autoclave as one used in Example 1 was deaerated, and then 1,500 g of ion-exchanged water, 17 g of ammonium perfluorooctanoate and 304 g of PPVE were charged thereinto. The internal temperature was increased to 60° C. with stirring by means of the anchor agitator at a rate of 300 rpm. When the internal temperature reached 60° C., TFE was injected until the internal pressure in the autoclave became 1.0 MPaG. 5 mL of a 2.5 mass % aqueous ammonium persulfate solution was added to initiate the polymerization reaction.

Since the internal pressure in the autoclave decreased along with the progress of the polymerization, TFE was injected when the pressure dropped to 0.99 MPa to increase the internal pressure in the autoclave to 1.01 MPaG. The polymerization reaction was continued while this operation was repeatedly carried out to maintain the internal pressure in the autoclave to a range of from 0.99 to 1.01 MPaG. 0.5 g of BrVE and 25.2 g of PPVE were injected into the autoclave every addition of 15 g of TFE. Addition of BrVE and PPVE was continued until 135 g of TFE was added. Upon addition of TFE of 150 g in total, addition of TFE was stopped, the internal temperature in the autoclave was decreased to 10° C. to terminate the polymerization reaction, whereby a latex of a fluorocopolymer 4 was obtained. The polymerization time was about 5 hours.

The latex was added to a 5 mass % aqueous aluminum potassium sulfate solution so that the latex underwent coagulation to obtain a fluorocopolymer 4. The obtained fluorocopolymer 4 was subjected to filtration, washed with ultrapure water and dried in an oven to obtain 387 g of a white and transparent fluorocopolymer 4. The composition of the fluorocopolymer 4 was such that repeating units based on TFE/repeating units based on PPVE/repeating units based on BrVE=54.6/43.9/1.5 (molar ratio). The fluorocopolymer 4 had a glass transition temperature of 2.8° C., a fluorine content of 73.6 mass % and a Mooney viscosity of 83. Physical properties of a crosslinked rubber sheet obtained from the fluorocopolymer 4 are shown in Table 1. The heat resistance was evaluated, and the result is shown in Table 1.

COMPARATIVE EXAMPLE 2

The same autoclave as one used in Example 1 was deaerated, and then 1,500 g of ion-exchanged water and 17 g of ammonium perfluorooctanoate were charged thereinto. The internal temperature was increased to 60° C. with stirring by means of the anchor agitator at a rate of 300 rpm. When the internal temperature reached 60° C., a preliminarily prepared mixed gas of TFE/PMVE=55/45 (molar ratio) was injected until the internal pressure in the autoclave became 1.0 MPaG. 5 mL of a 2.5 mass % aqueous ammonium persulfate solution was added to initiate the polymerization reaction.

Since the internal pressure in the autoclave decreased along with the progress of the polymerization, a post-addition mixed gas of TFE/PMVE=20/80 (molar ratio) was injected to maintain the internal pressure in the autoclave to a range of from 0.99 to 1.01 MPaG, and the polymerization reaction was continued. BrVE was injected into the autoclave every addition of 13 g of the post-addition mixed gas. Addition of BrVE was continued until 377 g of the post-addition mixed gas was added. Upon addition of the post-addition mixed gas of 400 g in total, addition of the post-addition mixed gas was stopped, the internal temperature in the autoclave was decreased to 10° C. to terminate the polymerization reaction, whereby a latex of a fluorocopolymer 5 was obtained. The polymerization time was about 6.5 hours.

The latex was added to a 5 mass % aqueous aluminum potassium sulfate solution so that the latex underwent coagulation to obtain a fluorocopolymer 5. The obtained fluorocopolymer 5 was subjected to filtration, washed with ultrapure water and dried in an oven of 120° C. to obtain 390 g of a white and transparent fluorocopolymer 5. The composition of the fluorocopolymer 5 was such that repeating units based on TFE/repeating units based on PMVE/repeating units based on BrVE=56.1/42.4/1.5 (molar ratio). The fluorocopolymer 5 had a glass transition temperature of −12.8° C., a fluorine content of 72.5 mass % and a Mooney viscosity of 35. Physical properties of a crosslinked rubber sheet obtained from the fluorocopolymer 5 are shown in Table 1. The heat resistance was evaluated, and the result is shown in Table 1.

COMPARATIVE EXAMPLE 3

The same autoclave as one used in Example 1 was deaerated, and then 908 g of ion-exchanged water, 7 g of ammonium perfluorooctanoate and 1.6 g of 1,4-diiodoctafluorobutane were charged thereinto. The internal temperature was increased to 80° C. with stirring by means of the anchor agitator at a rate of 600 rpm. When the internal temperature reached 80° C., a preliminarily prepared mixed gas of TFE/PMVE=30/70 (molar ratio) was injected until the internal pressure in the autoclave became 0.60 MPaG. 5 mL of a 0.5 mass % aqueous ammonium persulfate solution was added to initiate the polymerization reaction.

Since the internal pressure in the autoclave decreased along with the progress of the polymerization, a post-addition mixed gas of TFE/PMVE=70/30 (molar ratio) was injected by its own pressure when the pressure dropped to 0.59 MPa to increase the internal pressure in the autoclave to 0.61 MPaG. The polymerization reaction was continued while this operation was repeatedly carried out to maintain the internal pressure in the autoclave to a range of from 0.59 to 0.61 MPaG. 5 mL of a 0.5 mass % aqueous ammonium persulfate solution was added every 4 hours. Upon addition of the post-addition mixed gas of 400 g in total, addition of the post-addition mixed gas was stopped, the internal temperature in the autoclave was decreased to 10° C. to terminate the polymerization reaction, whereby a latex of a fluorocopolymer 6 was obtained. The polymerization time was about 15 hours.

The latex was added to a 5 mass % aqueous aluminum potassium sulfate solution so that the latex underwent coagulation to isolate a fluorocopolymer 6. The obtained fluorocopolymer 6 was subjected to filtration, washed with ultrapure water and vacuum dried at 50° C. to obtain 390 g of a white and transparent fluorocopolymer 6. The fluorocopolymer 6 had such a composition that repeating units based on TFE/repeating units based on PMVE=70.0/30.0 (molar ratio), and had an iodine content of 0.2 mass %. The fluorocopolymer 6 had a glass transition temperature of −0.1° C. and a Mooney viscosity of 100. Physical properties of a crosslinked rubber sheet obtained from the fluorocopolymer 6 are shown in Table 1. The heat resistance was evaluated, and the result is shown in Table 1.

TABLE 1

| | | Example 1 | Example 2 | Example 3 | Comparative Example 1 | Comparative Example 2 | Comparative Example 3 |
|---|---|---|---|---|---|---|---|
| Fluorocopolymer | | 1 | 2 | 3 | 4 | 5 | 6 |
| Characteristics | Mooney viscosity | 70 | 71 | 45 | 35 | 83 | 100 |
| | Glass transition temperature (° C.) | −5.8 | −6.0 | −9.8 | −12.8 | 2.8 | −0.1 |
| Physical properties of crosslinked rubber | Hardness | 79 | 78 | 77 | 76 | 85 | 85 |
| | Tensile strength (MPa) | 19.5 | 19.3 | 18.8 | 12.8 | 6.4 | 25.4 |
| | Elongation at break (%) | 124 | 136 | 156 | 117 | 170 | 150 |
| | Heat resistance | A | A | A | B | B | B |

The fluorocopolymer of the present invention is useful for O-rings, sheets, gaskets, oilseals, diaphragms and V-rings. Further, it is applicable to sealing materials for semiconductor devices, chemical resistant sealing materials, coatings, covering materials for electric wires, etc.

The entire disclosure of Japanese Patent Application No. 2004-245264 filed on Aug. 25, 2004 including specification, claims and summary is incorporated herein by reference in its entirety.

The invention claimed is:

1. A perfluoroelastomer which comprises repeating units (a) based on tetrafluoroethylene, repeating units (b) based on perfluoro(methyl vinyl ether) and repeating units (c) based on perfluoro(propyl vinyl ether) in a molar ratio of (a)/(b)/(c) of (40-70)/(3-57)/(3-57).

2. The perfluoroelastomer according to claim 1, which further comprises, in addition to the above repeating units (a),(b) and (c), repeating units (d) based on a monomer represented by the formula $CF_2$=$CFOR^fX$ (wherein $R^f$ is a $C_{1-10}$ perfluoroalkylene group or a $C_{1-10}$ perfluoroalkylene group containing an etheric oxygen atom, and X is Cl, Br, I or CN) in a molar ratio of (d)/((a)+(b)+(c)) of from 0.01 to 10.

3. The perfluoroelastomer according to claim 2, wherein the monomer represented by the formula $CF_2$=$CFOR^fX$ is $CF_2$=$CFOCF_2CF_2BR$.

4. The perfluoroelastomer according to any one of claims 1 to 3, which has a glass transition temperature of at most −1° C.

5. The perfluoroelastomer of claim 1, wherein said perfluoroelastomer has a Mooney viscosity of 20 to 150.

6. The perfluoroelastomer of claim 1, which has a glass transition temperature of at most −4° C.

7. The perfluoroelastomer of claim 1, wherein tetrafluoroethylene, perfluoro(methyl vinyl ether) and perfluoro(propyl vinyl ether) are subjected to radical copolymerization in the presence of a radical polymerization initiator.

8. The perfluoroelastomer of claim 1, wherein tetrafluoroethylene, perfluoro(methyl vinyl ether) and perfluoro(propyl vinyl ether) are subjected to radical copolymerization in the presence of a radical polymerization initiator and a chain transfer agent.

9. The perfluoroelastomer of claim 8, wherein said chain transfer agent is at least one selected from the group consisting of an alcohol, a chlorofluorohydrocarbon, a hydrocarbon, $RI_2$, where R is a $C_{1-16}$ saturated polyfluoroalkylene group, RIBr where R is a $C_{1-16}$ saturated polyfluoroalkylene group or a mercaptan.

10. The perfluoroelastomer of claim 9, wherein said chain transfer agent is $RI_2$ in an amount of 0.01 to 5 mol % based on the total number of moles of monomers.

11. The perfluoroelastomer of claim 1, wherein tetrafluoroethylene, perfluoro(methyl vinyl ether) and perfluoro(propyl vinyl ether) are subjected to radical copolymerization in the presence of a radical polymerization initiator, an aqueous medium and an emulsifier.

12. The perfluoroelastomer of claim 11, wherein said emulsifier is an anionic emulsifier.

13. The perfluoroelastomer of claim 11, wherein said emulsifier is used in an amount of 0.01 to 15 parts by mass per 100 parts by mass of said aqueous medium.

14. A method for producing the perfluoroelastomer as defined in claim 1, which comprises radical copolymerization of tetrafluoroethylene, perfluoro(methyl vinyl ether) and perfluoro(propyl vinyl ether) in the presence of a radical polymerization initiator.

15. The method for producing the perfluoroelastomer according to claim 14, wherein the radical copolymerization is carried out in the presence of a monomer represented by the formula $CF_2\!\!=\!\!CFOR^fX$ (wherein $R^f$ is a $C_{1-10}$ perfluoroalkylene group or a $C_{1-10}$ perfluoroalkylene group containing an etheric oxygen atom, and X is Cl, Br, I or CN).

16. The method for producing the perfluoroelastomer according to claim 14 or 15, wherein the radical copolymerization is carried out in the presence of a compound represented by the formula $RI_2$ (wherein R is a $C_{1-16}$ polyfluoroalkylene group) as a chain transfer agent.

17. The method for producing the perfluoroelastomer according to claim 16, wherein the chain transfer agent is 1,4-diiodoperfluorobutane.

18. The method for producing the perfluoroelastomer according to any one of claims 14 or 15, wherein the radical copolymerization is emulsion polymerization.

19. A crosslinked rubber formed by crosslinking the perfluoroelastomer as defined in any one of claims 1 to 3 by an organic peroxide.

20. The crosslinked rubber of claim 19, wherein said fluoroelastomer is crosslinked in the presence of a crosslinking aid.

* * * * *